US009651375B2

(12) United States Patent
Kuhlmann et al.

(10) Patent No.: US 9,651,375 B2
(45) Date of Patent: May 16, 2017

(54) YAW-RATE SENSOR WITH A COMPENSATING MASS

(71) Applicant: Robert Bosch GmbH, Stuttgart (DE)

(72) Inventors: Burkhard Kuhlmann, Reutlingen (DE); Rolf Scheben, Stuttgart (DE); Daniel Christoph Meisel, Reutlingen (DE); Benjamin Schmidt, Stuttgart (DE); Thorsten Balslink, Kirchentellinsfurt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 938 days.

(21) Appl. No.: 13/889,791

(22) Filed: May 8, 2013

(65) Prior Publication Data

US 2013/0298672 A1 Nov. 14, 2013

(30) Foreign Application Priority Data

May 11, 2012 (DE) .................. 10 2012 207 937

(51) Int. Cl.
*G01C 19/00* (2013.01)
*G01C 19/56* (2012.01)
*G01C 19/5747* (2012.01)

(52) U.S. Cl.
CPC ......... *G01C 19/56* (2013.01); *G01C 19/5747* (2013.01)

(58) Field of Classification Search
CPC ................................. G01C 19/5747
See application file for complete search history.

(56) References Cited

U.S. PATENT DOCUMENTS

| 4,653,325 | A | * | 3/1987 | Hojo | G01P 15/08 |
| | | | | | 310/329 |
| 6,018,996 | A | * | 2/2000 | Matsuhiro | G01C 19/5649 |
| | | | | | 73/504.12 |
| 7,134,337 | B2 | | 11/2006 | Willig et al. | |
| 7,243,542 | B2 | * | 7/2007 | Hulsing, II | G01C 19/5719 |
| | | | | | 73/504.04 |
| 7,284,429 | B2 | * | 10/2007 | Chaumet | G01C 19/5747 |
| | | | | | 73/504.12 |
| 7,461,552 | B2 | * | 12/2008 | Acar | G01P 15/125 |
| | | | | | 73/504.04 |
| 8,322,213 | B2 | * | 12/2012 | Trusov | G01C 19/5747 |
| | | | | | 73/504.12 |
| 8,443,668 | B2 | * | 5/2013 | Ohms | G01C 19/5747 |
| | | | | | 73/504.12 |
| 8,459,110 | B2 | * | 6/2013 | Cazzaniga | G01C 19/5747 |
| | | | | | 73/504.12 |

(Continued)

FOREIGN PATENT DOCUMENTS

WO  WO 03/064975  8/2003

*Primary Examiner* — Harshad R Patel
*Assistant Examiner* — Samir M Shah
(74) *Attorney, Agent, or Firm* — Gerard Messina

(57) ABSTRACT

A yaw-rate sensor, having a substrate which has a main extension plane, for detecting a yaw rate about a first direction extending either parallel to the main extension plane or perpendicular to the main extension plane. The yaw-rate sensor has a drive device, a first Coriolis mass and a second Coriolis mass, the drive device being configured to drive at least one part of the first Coriolis mass and at least one part of the second Coriolis mass in a direction parallel to a drive direction extending perpendicular to the first direction.

14 Claims, 18 Drawing Sheets

(56) References Cited

U.S. PATENT DOCUMENTS

| | | | | |
|---|---|---|---|---|
| 8,561,465 | B2* | 10/2013 | Classen | G01C 19/574 73/504.12 |
| 8,844,357 | B2* | 9/2014 | Scheben | G01C 19/5747 73/504.12 |
| 2006/0169041 | A1* | 8/2006 | Madni | G01C 19/5607 73/504.02 |
| 2007/0062282 | A1* | 3/2007 | Akashi | G01C 19/5719 73/504.12 |
| 2010/0281977 | A1* | 11/2010 | Coronato | G01C 19/5712 73/504.14 |
| 2011/0061460 | A1* | 3/2011 | Seeger | G01C 19/5719 73/504.12 |
| 2011/0252887 | A1* | 10/2011 | Cardarelli | F16F 15/03 73/514.32 |
| 2012/0125099 | A1* | 5/2012 | Scheben | G01C 19/5747 73/504.12 |

* cited by examiner

YAW-RATE SENSOR WITH A COMPENSATING MASS

CROSS REFERENCE

The present application claims the benefit under 35 U.S.C. §119 of German Patent Application No. DE 102012207937.8 filed on May 11, 2012, which is expressly incorporated herein by reference in its entirety.

FIELD

The present invention relates to a yaw-rate sensor.

BACKGROUND INFORMATION

PCT Application No. WO 03064975 A1 describes a yaw-rate sensor having two oscillating mass elements. Micromechanical yaw-rate sensors for measuring yaw rates about a direction parallel to the main extension plane of the sensor substrate are usually implemented with masses oscillating in planar fashion or as masses rotating in the plane, which, in response to the occurrence of a rotational movement about the direction parallel to the main extension plane, are subject to a Coriolis force in a detection direction, that is, in a direction perpendicular to the main extension plane. This Coriolis force is either ascertained via the electrostatic counterforce necessary for the position-back control (closed-loop control) or, for example, is measured via the change in capacitance because of the change in distance to the substrate (open-loop operation). Typically, such conventional yaw-rate sensors have two oscillatory masses (partial oscillators), which are driven to an antiparallel mode. In response to the existence of a yaw rate, the Coriolis force excites an antiparallel detection oscillation which is detected capacitively and converted by evaluation electronics into a yaw rate. It is the state of technological development that a partial oscillator is made up of a drive oscillator and a Coriolis oscillator. The drive oscillator participates only in the drive movement and not the detection oscillation. The Coriolis element participates both in the drive oscillation and the detection oscillation. For relevant cases of application in practice, besides the Coriolis force, there are further forces to which sensors or parts thereof are subjected and which likewise are able to give rise to a signal, or which are able to falsify the signal assigned to the Coriolis force, especially inertial forces produced by linear accelerations and by rotational accelerations. The occurrence of these forces leads disadvantageously to false signals during operation because, for example, a rotational acceleration, e.g., in the form of a rotary oscillation about the sensitive axis, leads directly to a yaw-rate signal. In particular, if the rotary oscillation takes place with the frequency with which the yaw-rate sensor is driven and takes place in phase with a Coriolis force, an especially great susceptibility to interference results. Furthermore, a linear acceleration along the detection direction leads to an unintentional deflection of the partial oscillator, as well.

An object of the present invention is to provide a yaw-rate sensor, and a method for operating a yaw-rate sensor, which does not have the disadvantages of conventional sensors and methods and which is insensitive both with respect to linear accelerations parallel to the detection direction and with respect to rotational accelerations according to the sensitive direction of the yaw-rate sensor.

SUMMARY

Yaw-rate sensors in accordance with an example embodiment of the present invention may have the advantage that they are insensitive with respect to interference accelerations in the form of rotational accelerations in terms of rotations about a direction which corresponds to the first direction (i.e., the direction which corresponds to the sensitive or measuring direction of the yaw-rate sensor), and in the form of linear accelerations parallel to the detection direction of the yaw-rate sensor. According to an example embodiment of the present invention, compensating weights are provided which are deflected in opposite direction to the Coriolis oscillator or Coriolis mass by a rotational acceleration, and thus prevent a deflection of the Coriolis-force mass due to a rotational acceleration. The compensating weights or the compensating masses in conjunction with rocker-type coupling elements lead to an improved (decreased) susceptibility to interference, especially with respect to rotational accelerations. The compensating weights are realized in such a way that a yaw rate is able to be detected, however. Furthermore, the compensating weights or compensating masses are also connected to the Coriolis masses in such a way that a deflection of the Coriolis mass is prevented in the case of a linear acceleration along the detection direction, as well. In accordance with the present invention, the Coriolis mass is connected with the compensating mass via a connection to the substrate in such a way that a linear acceleration along the detection direction and a rotational acceleration along the sensitive direction of the yaw-rate sensor lead to an inertial force which acts equally on the compensating masses and the Coriolis masses, (or the driven parts of the Coriolis masses), so that the action of force is directly neutralized via this rocker-type coupling. The result of this according to the present invention is that the yaw-rate sensor does not recognize such a rotational acceleration or such a linear acceleration. A further advantage of the yaw-rate sensor according to the present invention is that the coupling of the Coriolis masses with the compensating masses via the connections to the substrate leads to improved robustness with respect to linear accelerations parallel to the detection direction, that is, the oscillators are not deflected along the detection direction.

Preferably, the mass and/or the moment of inertia of the compensating weight is matched to the mass and/or the moment of inertia of the Coriolis element. In so doing, the lever ratios must be taken into account, that is, the distances of the centers of mass of the compensating weight and the Coriolis element from the rotation point of the rocker-type coupling element.

According to the present invention, the yaw-rate sensor may be designed either in such a way that a yaw rate about a first direction extending parallel to the main extension plane is detected (first specific embodiment: case of a $\Omega_y$-sensor (i.e., a yaw-rate sensor whose sensitive direction is a rotation about a first direction running parallel to the main extension plane), or of a $\Omega_y$-sensor rotated by 90° about the z-direction, that is, a $\Omega_x$-sensor). In this case, a drive device is provided which drives the first Coriolis mass and the second Coriolis mass in a direction parallel to the drive direction extending perpendicular to the first direction (especially in opposite direction), the drive direction likewise running parallel to the main extension plane. In the first specific embodiment, the detection direction then extends perpendicular to the main extension plane. In the first specific embodiment of the yaw-rate sensor, according to a first variant, only a first Coriolis mass (and correspondingly, only a first compensating mass and a first connection) (or rather, only one Coriolis mass, one compensating mass and one connection) may be provided, or else also—according to a second variant—both a first Coriolis mass and a second Coriolis mass, a first compensating mass and a second compensating mass and a first and second connection). However, according to the present invention, the yaw-rate sensor may also be designed in such a way (second specific embodiment: case of a $\Omega_z$-sensor) that the first direction does not extend parallel to the main extension plane, but rather perpendicular to the main extension plane. In this case, the drive device is provided to drive the first and second Coriolis masses in a direction parallel to the drive direction extending parallel to the main extension plane, the detection direction then likewise extending parallel to the main extension plane, but perpendicular to the drive direction. In the second specific embodiment of the yaw-rate sensor, according to a first variant, only a first Coriolis mass (and correspondingly, only a first compensating mass and a first connection) (or rather, only one Coriolis mass, one compensating mass and one connection) may be provided, or else also—according to a second variant—both a first Coriolis mass and a second Coriolis mass, a first compensating mass and a second compensating mass and a first and second connection). According to a third specific embodiment of the yaw-rate sensor according to the present invention (case of a $\Omega_{xy}$-sensor), as an alternative to a linear drive by the drive device, the drive device may also be configured to drive the first Coriolis mass to a rotary oscillation about a direction extending perpendicular to the main extension plane, and in the case of a yaw rate about the first direction, a partial area of the first Coriolis mass undergoing a Coriolis acceleration parallel to a detection direction extending perpendicular to the first direction and perpendicular to the main extension plane, and a second partial area of the first Coriolis mass in the case of a yaw rate about the second direction undergoing a Coriolis acceleration parallel to the detection direction.

Developments and further refinements of the present invention may be gathered from the description below with reference to the figures.

According to one preferred further refinement, especially of the first specific embodiment of the present invention, it is provided that the first Coriolis mass has a first partial mass and a second partial mass, and that the second Coriolis mass has a third partial mass and a fourth partial mass, the drive device being configured to drive the first partial mass of the first Coriolis mass and the third partial mass of the second Coriolis mass in a direction parallel to the drive direction. In the case of a yaw rate about the first direction, the first partial mass of the first Coriolis mass undergoes a Coriolis acceleration parallel to the detection direction and the second partial mass of the first Coriolis mass thereby also deflecting, the third partial mass of the second Coriolis mass in the case of a yaw rate about the first direction undergoing a Coriolis acceleration parallel to the detection direction and the fourth partial mass of the second Coriolis mass thereby also deflecting. The first compensating mass has a coupling with the second partial mass of the first Coriolis mass via the first connection to the substrate, and the second compensating mass has a coupling with the fourth partial mass of the second Coriolis mass via the second connection to the substrate, such that a deflection of the second partial mass of the first Coriolis mass and the fourth partial mass of the second Coriolis mass in a direction parallel to the detection direction caused by a Coriolis acceleration leads to a deflection of the first and second compensating masses, in each case in opposite direction. In this manner, it is advantageously possible that the second and fourth partial masses do not participate in the drive movement and (due to their relatively rigid or strong coupling with the first and third partial mass, respectively, (on which the Coriolis force acts) along the detection direction), execute the movement in the detection direction exclusively, thereby permitting a better signal evaluation.

According to another preferred further refinement, particularly of the first specific embodiment of the present invention, the first direction and the drive direction run parallel to the main extension plane, the drive device being configured to drive the first Coriolis mass and the second Coriolis mass in a direction parallel to the drive direction extending perpendicular to the first direction, the detection direction running perpendicular to the main extension plane, and according to alternative embodiment variants with respect to the mechanical structure of the movable elements of the yaw-rate sensor, it being provided especially that:

along the drive direction, the first and second Coriolis masses are disposed in the central area of the yaw-rate sensor and the first and second compensating masses are disposed in the edge area, preferably the first compensating mass being formed by two mass elements, and the second compensating mass likewise being formed by two mass elements, or that along the drive direction, the first and second compensating masses are disposed in the central area of the yaw-rate sensor and the first and second Coriolis masses are disposed in the edge area, or that along the first direction, the first and second Coriolis masses are disposed in the central area of the yaw-rate sensor and the first and second compensating masses are disposed in the edge area, preferably the first compensating mass being formed by two mass elements, and the second compensating mass likewise being formed by two mass elements.

In this manner, it is advantageously possible according to the present invention to realize the advantages of the present invention when working with various mechanical structures.

According to another preferred further refinement, particularly according to the second specific embodiment, the first direction runs perpendicular to the main extension plane, the drive device being configured to drive the first Coriolis mass and the second Coriolis mass in a direction parallel to the drive direction extending perpendicular to the first direction, and in the case of a yaw rate about the first direction, the first Coriolis mass and the second Coriolis mass undergoing a Coriolis acceleration parallel to the detection direction, the first compensating mass also being coupled with the second Coriolis mass and the second compensating mass being coupled with the first Coriolis mass via the first connection and via the second connection. According to the present invention, it is thereby advantageously possible to realize the coupling according to the invention between the Coriolis masses and the compensating masses for the case of a $\Omega_z$-sensor (i.e., a yaw-rate sensor whose sensitive direction is a rotation about the direction perpendicular to the main extension plane), as well. In this case, such a specific embodiment advantageously represents an implementation in which the movable structures of the yaw-rate sensor which form the compensating masses, at the same time also provide the function of the second and fourth partial masses, that is, provide the function of detection elements on which—as part of Coriolis masses including various elements—the drive movement is not forced, rather only the movement in a direction parallel to the respective detection direction is forced.

According to another preferred further refinement, particularly according to the second specific embodiment, the first direction runs perpendicular to the main extension plane, the drive device being configured to drive the first Coriolis mass and the second Coriolis mass in a direction parallel to the drive direction extending perpendicular to the first direction, and in the case of a yaw rate about the first direction, the first Coriolis mass and the second Coriolis mass undergoing a Coriolis acceleration parallel to the detection direction, the first and second Coriolis masses being coupled via a third connection to the substrate and/or the first and second compensating masses being coupled via a fourth connection to the substrate. According to the present invention, it is thereby advantageously possible by the action of the compensating masses, to avoid interference signals.

According to another preferred further refinement, particularly according to the first, second or third specific embodiment, it is provided that
  the first Coriolis mass is in the form of a closed frame and the first compensating mass is disposed within the frame of the first Coriolis mass, and the second Coriolis mass is likewise in the form of a closed frame and the second compensating mass is disposed within the frame of the second Coriolis mass, and/or that
  the drive device is configured to drive the first Coriolis mass and the second Coriolis mass in the drive direction, in each case in opposite direction relative to each other, or that the drive device is configured to drive the first partial mass of the first Coriolis mass and the third partial mass of the second Coriolis mass in the drive direction, in each case in opposite direction relative to each other, and/or that
  the drive device has a drive frame, the drive frame having four angular elements which in the corners of the frame, are connected to the substrate so as to be deflectable in rotatory manner, in each case two of the angular elements being joined to each other via U-shaped spring elements.

Exemplary embodiments of the present invention are shown in the figures and explained in greater detail below.

DETAILED DESCRIPTION OF EXAMPLE EMBODIMENTS

Figure 1:
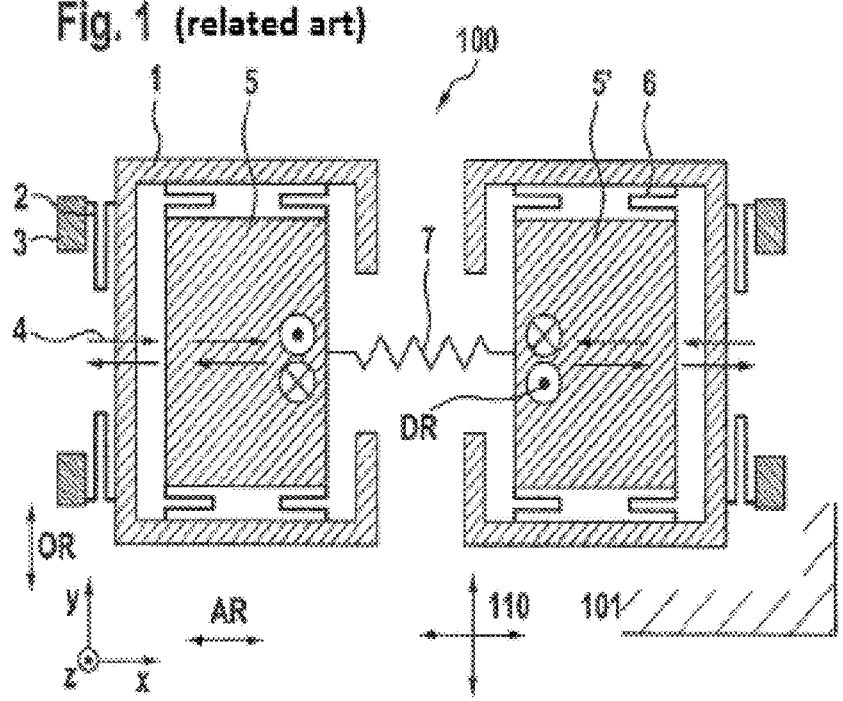
FIGS. 1 and 2 each show a schematic diagram of a conventional yaw-rate sensor as a $\Omega_y$-sensor according to the related art.

Identical parts are provided with the same reference numerals in the various figures, and therefore generally are in each case designated or mentioned only once, as well.

Figure 2:
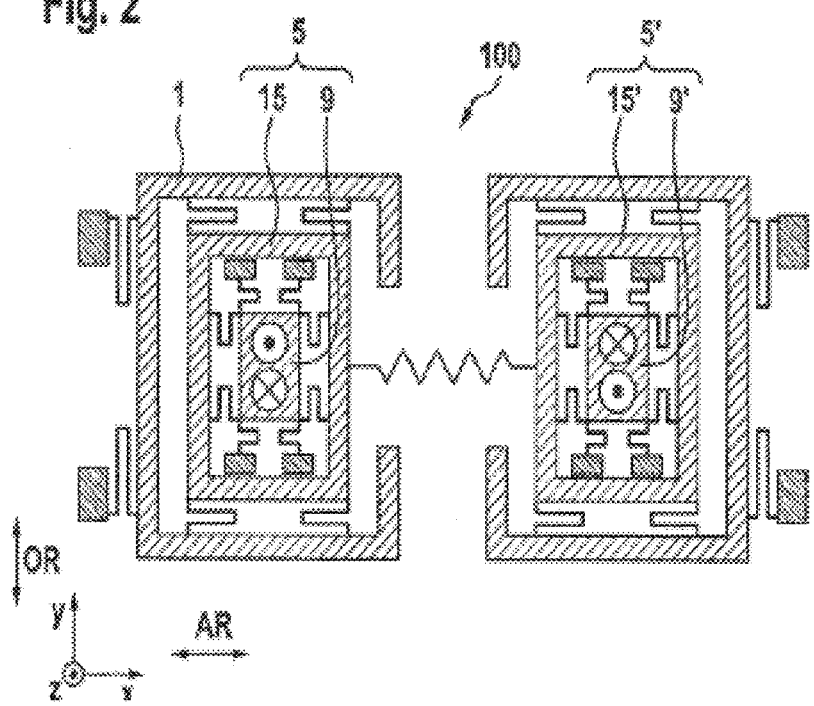

FIGS. 1 and 2 each show schematic diagrams of conventional, especially micromechanically produced, yaw-rate sensors 100 which are provided to detect yaw rates about a first direction OR (in the example of a $\Omega_y$-sensor in FIGS. 1 and 2, this corresponds to the y-axis), and which are realized on a substrate 101 that has a main extension plane 110 and pre-defines it for the sensor or yaw-rate sensor, as well. Substrate 101 and main extension plane 110 are drawn in only in FIG. 1, however are likewise present in the case of all FIGS. 1, 2, as well as 4 through 23, since all these figures depict top views of the sensor structures, that is, the drawing plane corresponds to main extension plane 110. Such yaw-rate sensors include two oscillatory masses (partial oscillators) which are driven to an antiparallel mode along a drive direction AR (in the example in FIGS. 1 and 2, this corresponds to the x-axis) that is perpendicular to first direction OR. In response to the presence of a yaw rate, the Coriolis force excites an antiparallel detection oscillation (parallel to a detection direction DR that is both perpendicular to first direction OR and perpendicular to drive direction AR), which is detected capacitively and converted by evaluation electronics into a yaw rate. Usually, such a partial oscillator of a yaw-rate sensor includes a drive oscillator as drive device 1 and a Coriolis oscillator as a first Coriolis mass 5. The other partial oscillator includes a second Coriolis mass 5'. Drive device 1 drives at least one part of first Coriolis mass 5 and at least one part of second Coriolis mass 5' in a direction parallel (and according to the antiparallel oscillation mode) to drive direction AR. According to the embodiment variant shown in FIG. 1, first and second Coriolis masses 5, 5' are moved completely both in drive direction AR and in detection direction DR, while first Coriolis mass 5 according to the embodiment variant shown in FIG. 2 has a first partial mass 15 and a second partial mass 9, and second Coriolis mass 5' has a third partial mass 15' and a fourth partial mass 9', only first partial mass 15 of first Coriolis mass 5 and third partial mass 15' of second Coriolis mass 5' being driven in drive direction AR, and in the case of a yaw rate about first direction OR, first partial mass 15 of first Coriolis mass 5 undergoing a Coriolis acceleration parallel to detection direction DR and second partial mass 9 of first Coriolis mass 5 thereby also deflecting, and third partial mass 15' of second Coriolis mass 5' in the case of this yaw rate (about first direction OR) undergoing a Coriolis acceleration parallel to detection direction DR and fourth partial mass 9' of second Coriolis mass 5' thereby also deflecting.

In both embodiment variants according to FIGS. 1 and 2, the drive oscillator is anchored with the aid of springs 2 via anchor points 3 to substrate 101. Springs 2 are U-shaped and are soft along the x-direction (in the example corresponding to drive direction AR). Along the y-direction (corresponding to first direction OR in the example) they are stiff. Along the z-direction (corresponding to detection direction DR in the example) they are likewise designed to be stiff, by constructing the layer thickness to be greater than the bar width. Drive device 1 is driven electrostatically and resonantly with its natural frequency, particularly with the aid of interdigital structures (not shown). Arrows 4 point in the direction of the drive movement, the partial oscillators, i.e., first and second Coriolis masses 5, 5', oscillating in phase opposition relative to each other, that is, the one partial oscillator moves—at least partially—in the negative x-direction, when the other partial oscillator is moving—at least partially—in the positive x-direction and vice versa. First and second Coriolis masses 5, 5' are joined to drive device 1 via coupling springs 6, so that first and second Coriolis masses 5, 5'(or, according to FIG. 2, first and third partial masses 15, 15' of first and second Coriolis masses 5, 5') are able to execute both drive movement 4 and the detection movement. The detection movement along the z-axis comes about because of a Coriolis acceleration or Coriolis force that results from yaw rate $\Omega_y$ about the y-axis and velocity $v_x$ along the x-axis according to $F_{Coriolis}=2*m*v_x \times \Omega_y$. Both the drive movement and the detection movement of the two partial oscillators are coupled with the aid of a coupling structure 7 between first and second Coriolis masses 5, 5'. For example, the detection electrodes (not shown) are located below first and second Coriolis masses 5, 5' on substrate 101.

Conditional upon design, conventional yaw-rate sensors may have an acceleration sensitivity and a rotational-acceleration sensitivity. This means that a rotational acceleration, e.g., in the form of a rotary oscillation about the sensitive axis (first direction OR, the y-axis in the example) leads directly to a yaw-rate signal. In particular, if the rotary oscillations take place with the frequency $f_A$ (with which the yaw-rate sensor is driven) and take place in phase with a Coriolis force, an especially great susceptibility to interference results. A rotational acceleration about first direction OR (here the y-axis) likewise leads to an equivalent force which typically cannot be differentiated from a Coriolis force. Furthermore, a linear acceleration along detection direction DR (here the z-axis) leads to an unintentional deflection of first and second Coriolis masses 5, 5' along detection direction DR (the z-axis in the example).

Figure 3:
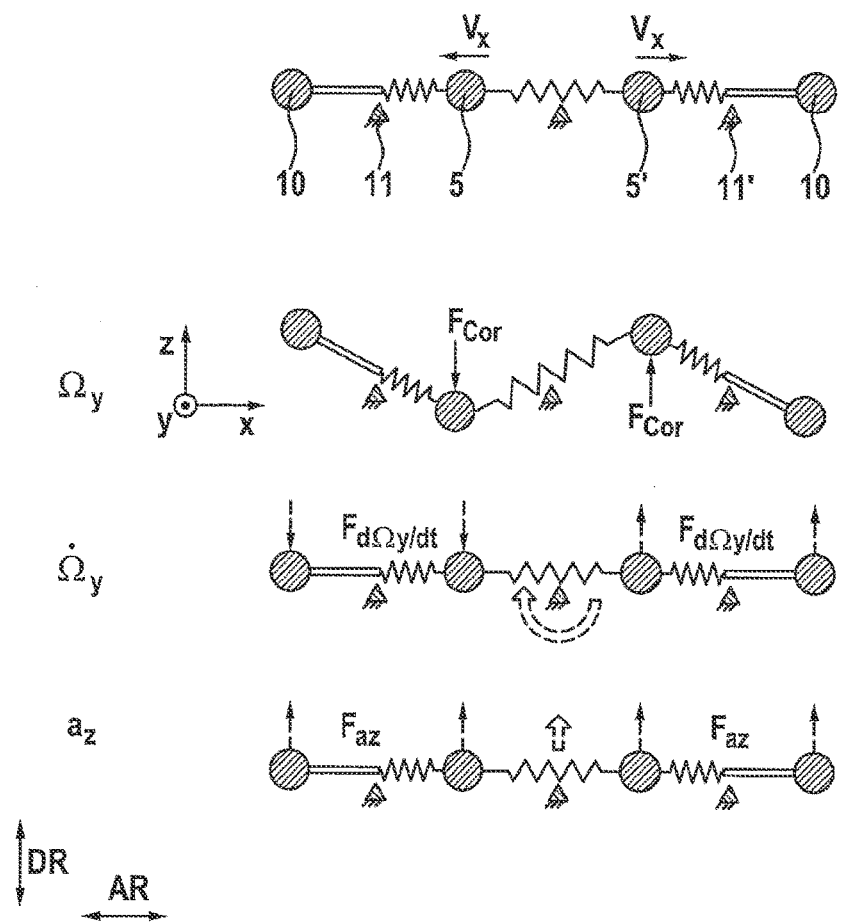
FIG. 3 shows a schematic diagram of an example embodiment of the present invention.

According to the present invention, compensating weights or compensating masses are now provided for each Coriolis mass 5, 5', that is, a first compensating mass 10 for first Coriolis mass 5 and a second compensating mass 10' for second Coriolis mass 5'. This is illustrated schematically for the state of rest and for a yaw rate $\Omega_y$ about the y-axis in the upper half of FIG. 3, the drawing plane corresponding to the xz-plane, (that is, drive direction AR (x-direction) and detection direction DR (y-direction)), and a yaw rate $\Omega_y$ leading (because of the inverse excitation by drive device 1) to a deflection of first and second Coriolis masses 5, 5' in opposite direction, and therefore (because of the fact that first and second compensating masses 10, 10' undergo no Coriolis acceleration) of first and second compensating masses 10, 10', as well. Coriolis masses 5, 5' are driven to a movement along drive direction AR, whereas compensating masses 10, 10' are not driven and are at rest (along drive direction AR). In response to a yaw rate $\Omega_y$, the Coriolis force ($F_{cor}$ according to the drawn-in arrows) acts upon driven Coriolis masses 5, 5'; no outer force acts upon non-driven (resting) compensating masses 10, 10'. Compensating masses 10, 10' are merely co-moved by Coriolis masses 5, 5' via the rocker-type coupling of first connection 11 and second connection 11' along detection direction DR, that is, are deflected in opposite direction, parallel to detection direction DR. If there is a rotational acceleration about the y-direction (first direction OR) or perhaps a linear acceleration parallel to detection direction DR, then the inertial force thereby resulting acts equally on all masses (on driven Coriolis masses 5, 5' just like on resting compensating masses 10, 10'), so that via the rocker-type coupling of first and second connections 11, 11', the action of force is directly neutralized, which is illustrated schematically in the lower half of FIG. 3 (corresponding to arrows $F_{d\Omega y/dt}$ and arrows $F_{az}$, respectively). The yaw-rate sensor then does not recognize the rotational acceleration or the linear acceleration, so to speak. Furthermore, the first and second connection according to the present invention to substrate 101 by the rocker-type coupling between the Coriolis masses and the compensating masses leads advantageously in the present invention to an improved robustness with respect to linear accelerations along the z-direction, that is, the Coriolis masses are not deflected along the z-axis.

The rocker-type formation of first and second connections 11, 11' to substrate 101 is realized according to the present invention in such a way that the coupling between first Coriolis mass 5 and first compensating mass 10 (or the coupling between second Coriolis mass 5' and second compensating mass 10') is accomplished in such a way that a deflection of first Coriolis mass 5 along detection direction DR leads to a deflection of first compensating mass 10 along detection direction DR in opposite direction and vice versa (or that a deflection of second Coriolis mass 5' along detection direction DR leads to a deflection of second compensating mass 10' along detection direction DR in opposite direction and vice versa).

Therefore, according to the present invention, in contrast to a yaw rate (about the $\Omega_y$-direction), the result of a rotational acceleration $d\Omega_y/dt$ (e.g., in the form of a rotary oscillation) about the sensitive axis (first direction OR, the y-axis in the example) is that compensating masses 10, 10' undergo an equidirectional action of force in comparison to respective first and second Coriolis masses 5, 5' (that is, first compensating mass 10 equidirectionally with respect to first Coriolis mass 5 and the second compensating mass equidirectionally with respect to second Coriolis mass 5'), so that according to the present invention, a deflection of the Coriolis masses due to a rotational acceleration is prevented. In conjunction with first connection 11 and second connection 11', especially in the form of a rocker-type coupling with substrate 101, first and second compensating masses 10, 10' lead to improved decreased interference susceptibility, particularly with respect to rotational accelerations. The compensating weights are realized in such a way that a yaw rate is able to be detected, however.

FIGS. 1, 2, 4 through 14 and 21 through 23 each show embodiment variants of yaw-rate sensors according to the present invention that have both a first Coriolis mass and a second Coriolis mass. Alternatively, however, it is also possible according to the present invention to provide corresponding yaw-rate sensors in which only one of the two partial oscillators is formed (with the first Coriolis mass, the first compensating mass and the first connection), and for the purpose of saving space and therefore reducing costs, not to provide the other partial oscillator.

Figure 4:
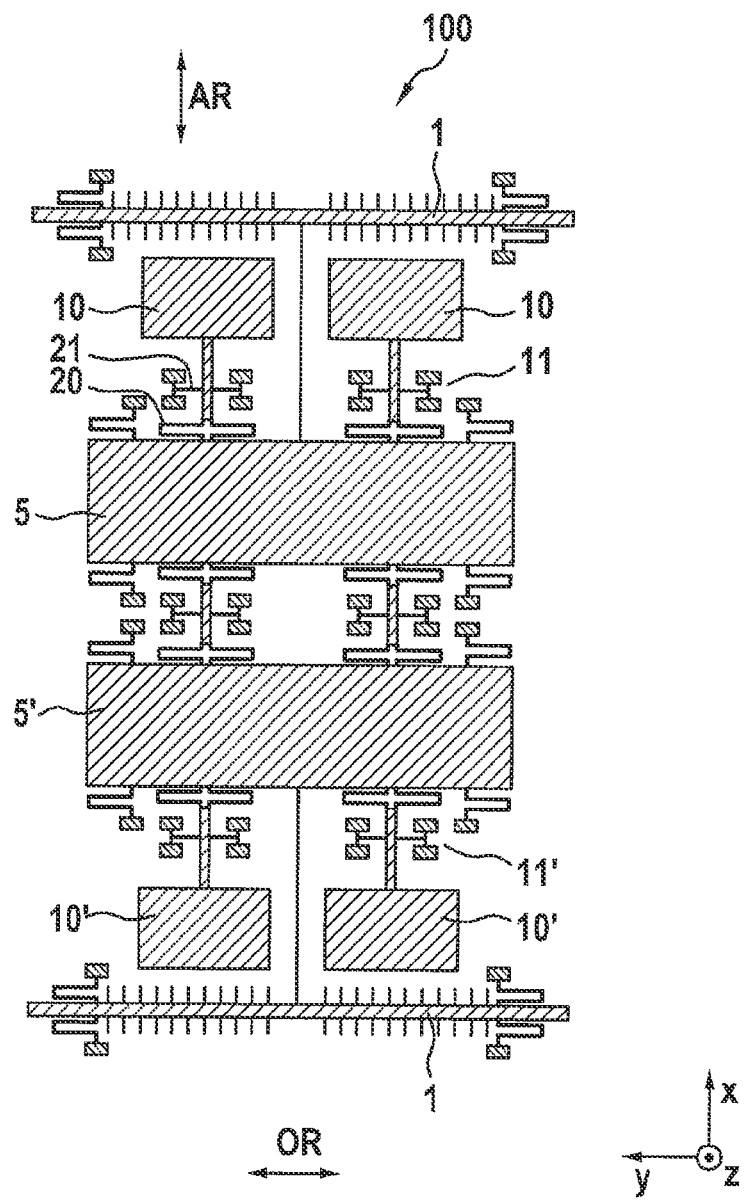
FIGS. 4 through 7 and 21 each shows different embodiment variants of a $\Omega_y$-sensor.
Figure 5:
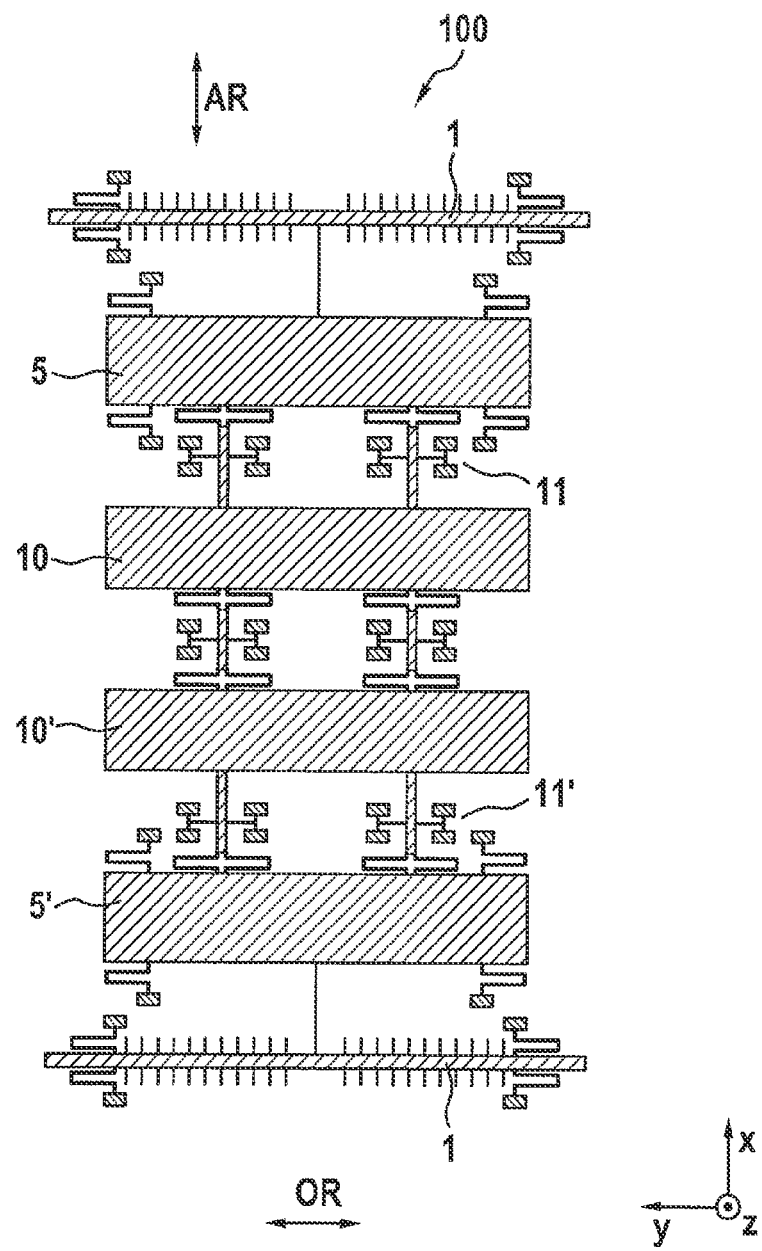
Figure 6:
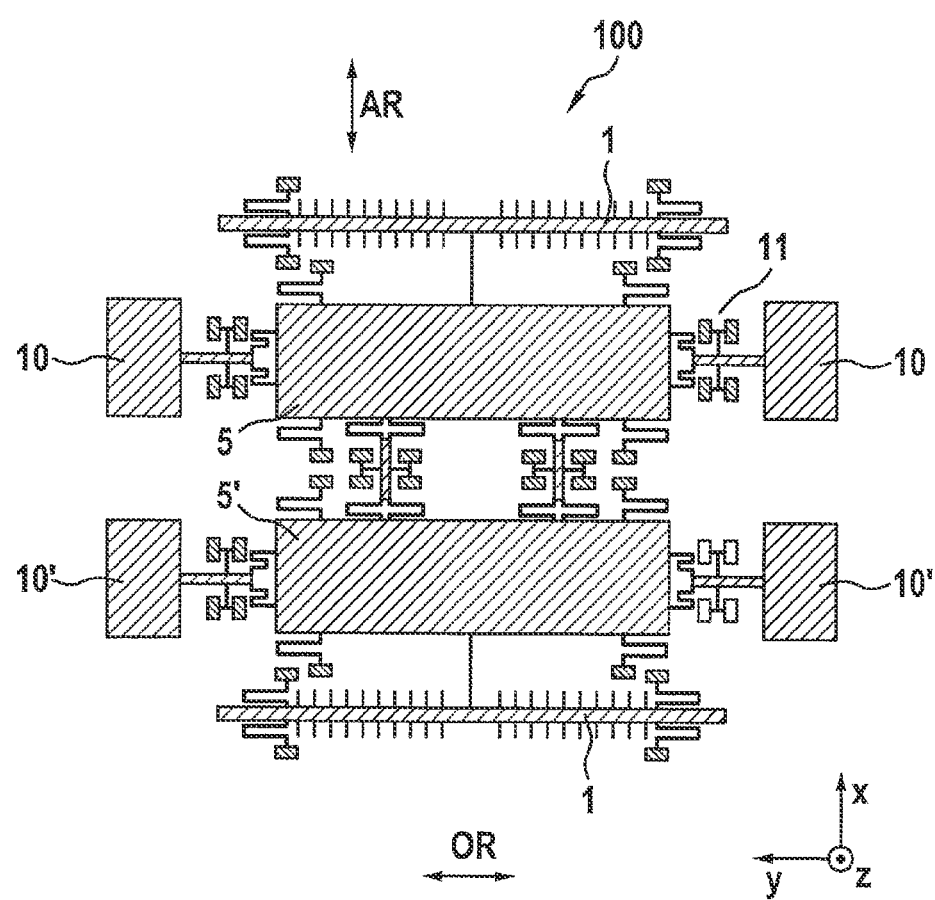
Figure 7:
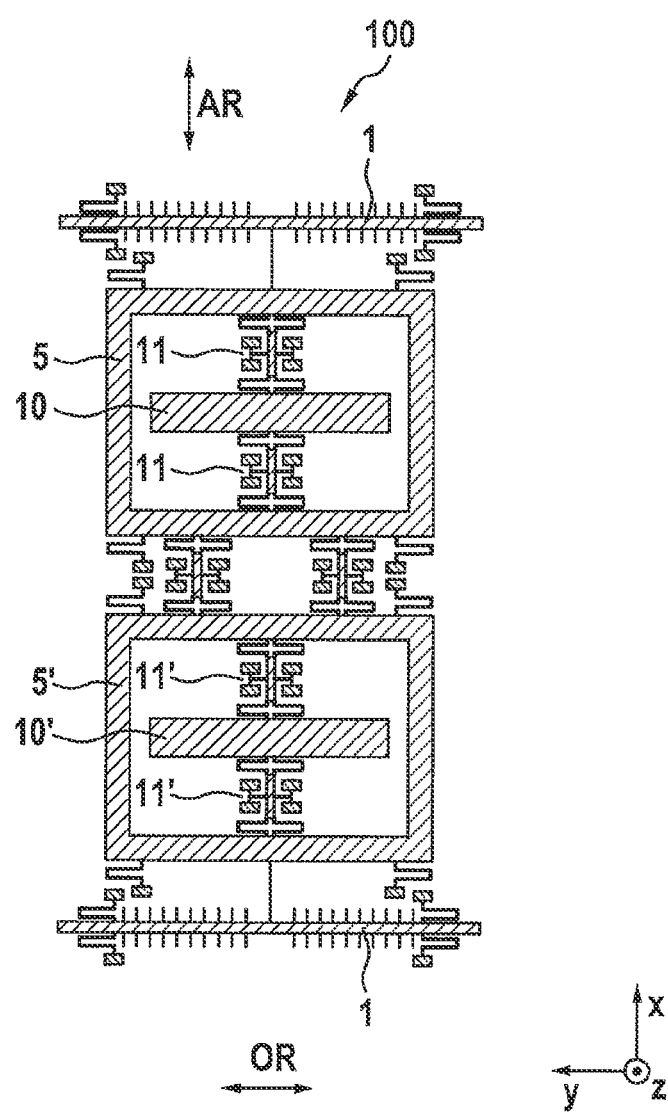
Figure 8:
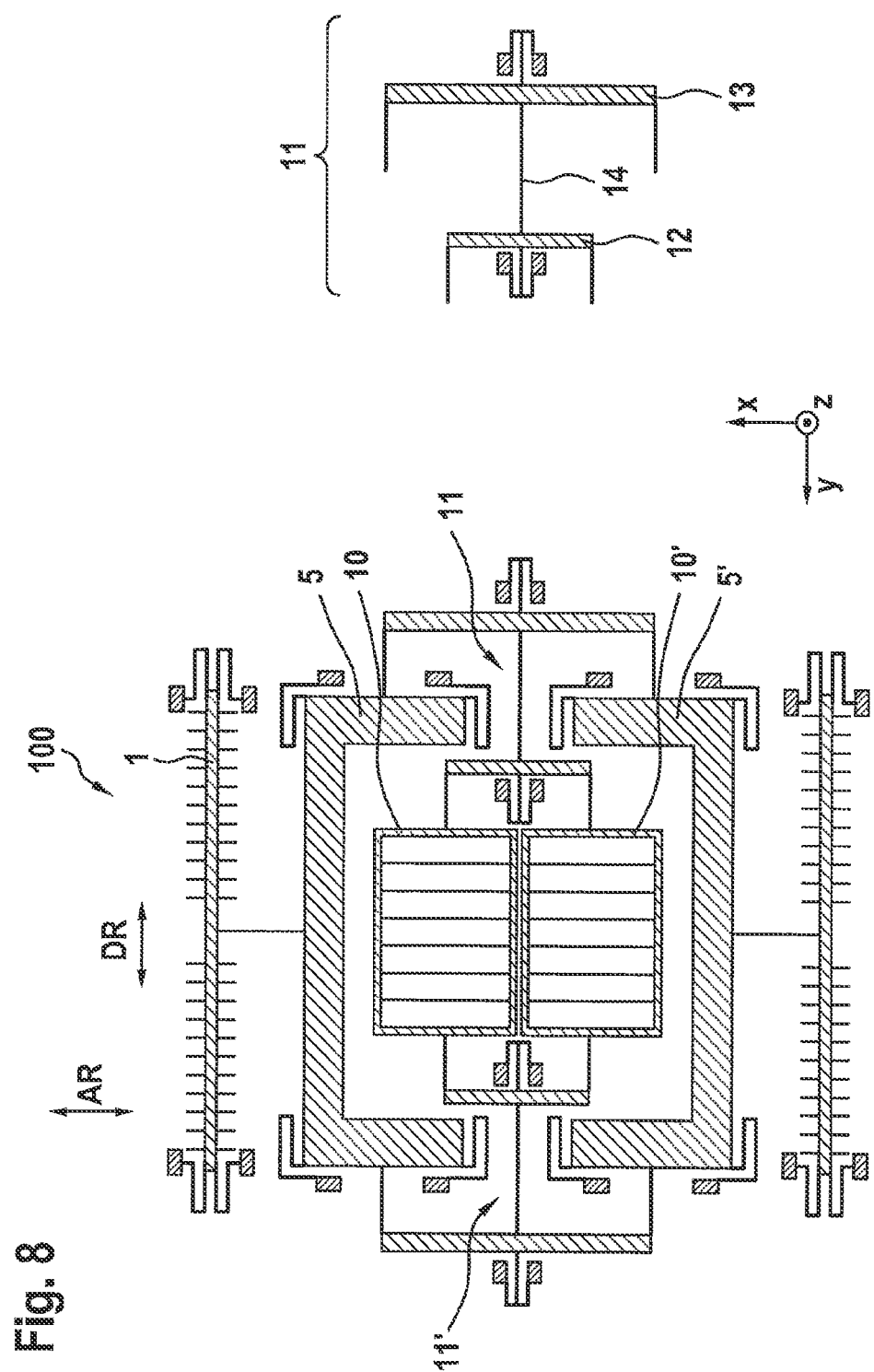
FIGS. 8 through 13, 22 and 23 each shows different embodiment variants of a $\Omega_z$-sensor.
Figure 21:
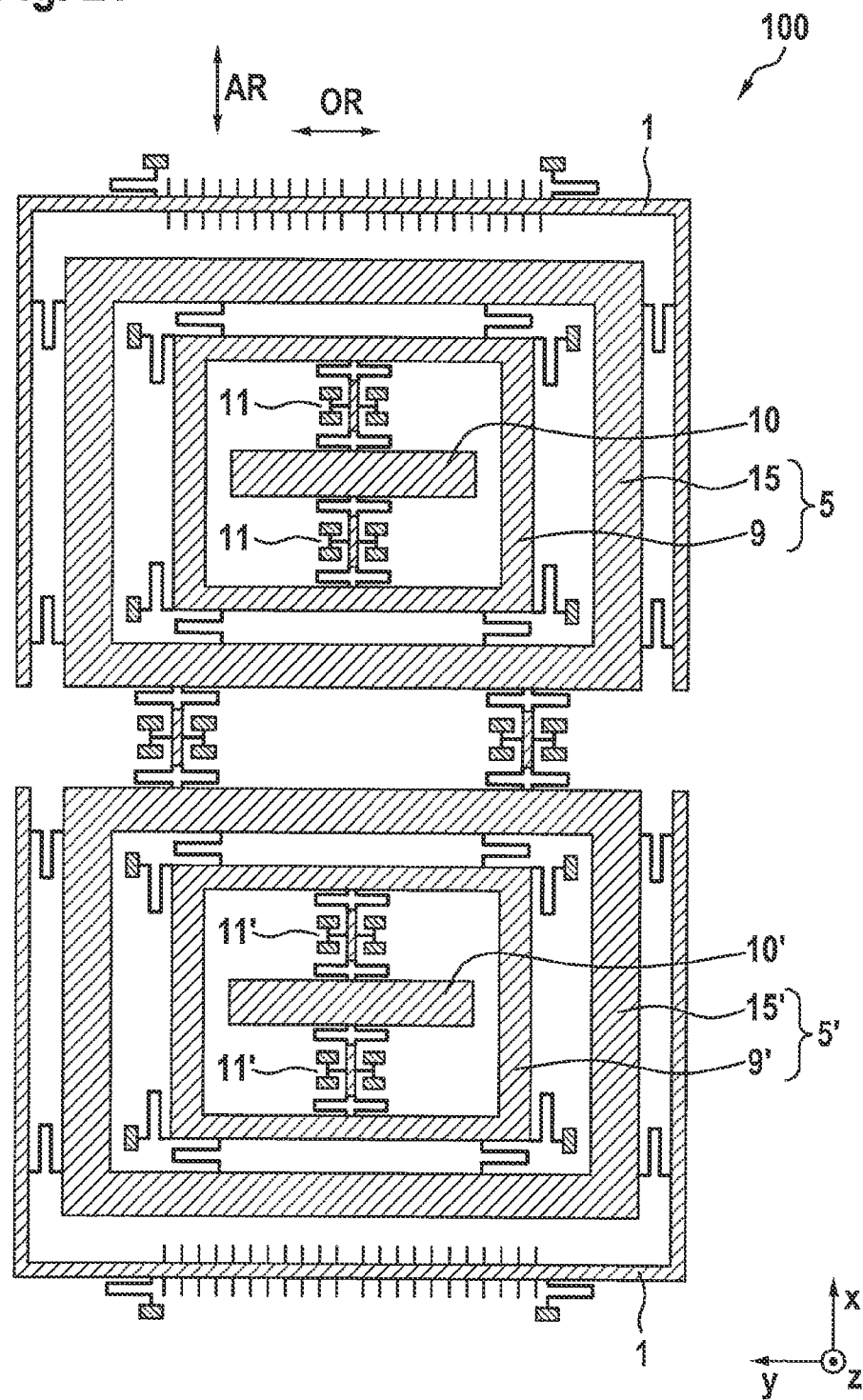

FIGS. 4 through 7 and 21 each show different embodiment variants of a Ωy-sensor 100 according to the present invention in top view. In FIG. 4, compensating masses 10, 10' are disposed relative to Coriolis masses 5, 5' in such a way that along drive direction AR, first and second Coriolis masses 5, 5' are situated in the central area of the yaw-rate sensor and first and second compensating masses 10, 10' are situated in the edge area. In other words, compensating masses 10, 10' are further away from the axis of symmetry of the yaw-rate sensor running parallel to the y-direction, that is, are situated further outside or in the edge area. In the exemplary embodiment according to FIG. 4, first compensating mass 10 is formed by two individual mass elements and second compensating mass 10' is likewise formed by two individual mass elements, the two individual mass elements in each case being separated by a drive bar, with whose aid first and second Coriolis masses 5, 5' are driven by drive device 1. In FIG. 5, compensating masses 10, 10' are disposed relative to Coriolis masses 5, 5' in such a way that along drive direction AR, first and second Coriolis masses 5, 5' are situated in the edge area of the yaw-rate sensor and first and second compensating masses 10, 10' are situated in the central area. In other words, compensating masses 10, 10' are situated closer to the axis of symmetry of the yaw-rate sensor running parallel to the y-direction than Coriolis masses 5, 5', that is, are located further inside or in the central area. In FIG. 6, compensating masses 10, 10' are disposed relative to Coriolis masses 5, 5' in such a way that along first direction OR, first and second Coriolis masses 5, 5' are situated in the central area of the yaw-rate sensor and first and second compensating masses 10, 10' are situated in the edge area. In other words, compensating masses 10, 10' are further away from the axis of symmetry of the yaw-rate sensor running parallel to the x-direction, that is, are situated further outside or in the edge area. In the exemplary embodiment according to FIG. 6, first compensating mass 10 is likewise formed by two individual mass elements and second compensating mass 10' is formed by two individual mass elements, as well, in each case the two individual mass elements being disposed symmetrically relative to the axis of symmetry of the sensor running parallel to the x-direction. FIG. 7 shows an embodiment variant of a $\Omega_y$-sensor according to the present invention, in which first Coriolis mass 5 is provided in the form of a closed frame and first compensating mass 10 is disposed within the frame of first Coriolis mass 5, and second Coriolis mass 5' is likewise provided in the form of a closed frame and second compensating mass 10' is situated within the frame of second Coriolis mass 5'. FIG. 21 shows an embodiment variant of a $\Omega_y$-sensor according to the present invention in which first Coriolis mass 5 has a first partial mass 15 and a second partial mass 9 and in which second Coriolis mass 5' has a third partial mass 15' and a fourth partial mass 9', the drive device being configured to drive first partial mass 15 of first Coriolis mass 5 and third partial mass 15' of second Coriolis mass 5' in a direction parallel to drive direction AR, and in the case of a yaw rate about first direction OR, first partial mass 15 of first Coriolis mass 5 undergoing a Coriolis acceleration parallel to detection direction DR (perpendicular to the drawing plane) and second partial mass 9 of first Coriolis mass 5 thereby also deflecting, third partial mass 15' of second Coriolis mass 5' in the case of a yaw rate about first direction OR undergoing a Coriolis acceleration parallel to detection direction DR and fourth partial mass 9' of second Coriolis mass 5' thereby also deflecting, first compensating mass 10 having a coupling with second partial mass 9 of first Coriolis mass 5 via first connection 11 to substrate 101, and second compensating mass 10' having a coupling with fourth partial mass 9' of second Coriolis mass 5' via second connection 11' to substrate 101, such that a deflection of second partial mass 9 of first Coriolis mass 5 and of fourth partial mass 9' of second Coriolis mass 5' in a direction parallel to detection direction DR caused by a Coriolis acceleration leads to a deflection of first and second compensating masses 10, 10', in each case in opposite direction. In the embodiment variant according to FIG. 21, it is provided, by way of example, that both first partial mass 15 and second partial mass 9 are frame-shaped (each in the form of a closed frame), and second partial mass 9 is disposed within the frame of first partial mass 15 of first Coriolis mass 5 and first compensating mass 10 is disposed within the frame of second partial mass 9 of first Coriolis mass 5 (and that furthermore, both third partial mass 15' and fourth partial mass 9' are frame-shaped (each in the form of a closed frame) and fourth partial mass 9' is disposed within the frame of third partial mass 15' of second Coriolis mass 5' and second compensating mass 10' is disposed within the frame of fourth partial mass 9' of second Coriolis mass 5'). As an alternative to the embodiment variant shown in FIG. 21, it may also be provided according to the present invention that for first Coriolis mass 5, first compensating mass 10 is disposed laterally next to second partial mass 9 (i.e., not within (a frame) of second partial mass 9), for instance, also divided up between two individual mass elements (which, for example, are located along the x-direction or along the y-direction, in each case laterally next to second partial mass 9), or that for second Coriolis mass 5', second compensating mass 10' is disposed laterally next to fourth partial mass 9'(i.e., not within (a frame) of second partial mass 9'), for instance, also divided up between two individual mass elements (which, for example, are located along the x-direction or along the y-direction, in each case laterally next to fourth partial mass 9').

According to all FIGS. 4 through 7 and 21 in the present invention, the rocker-type formation of first and second connections 11, 11' to substrate 101 has springs 20 between the connection to substrate 101 and the respective Coriolis mass, which by suitable selection of bar widths, bar heights and bar lengths, are set up in such a way that they allow a linear movement of the Coriolis mass along the x-direction (i.e., along drive direction AR), and couple the movements in the z-direction (i.e., along detection direction DR) of the Coriolis mass and the compensating mass to each other. The spring denoted by reference numeral 21 is realized as a torsion spring for a torsion about the y-direction. Situated below and/or above the structures are electrodes and counter-electrodes, respectively, (not shown) by which the yaw rate is able to be determined and the properties of the oscillatory system (that is, the Coriolis mass and the compensating mass) are able to be influenced. Between the electrode fingers of drive device 1 are counter-electrodes (not shown), attached to substrate 101, for exciting the drive oscillation and electrodes for detecting the drive oscillation. Rocker-type first and second connections 11, 11' are effectuated by the meandered spring elements in such a way that only the detection movement and not the drive movement of first and second Coriolis masses 5, 5' is transferred to first and second compensating masses 10, 10'.

Figure 9:
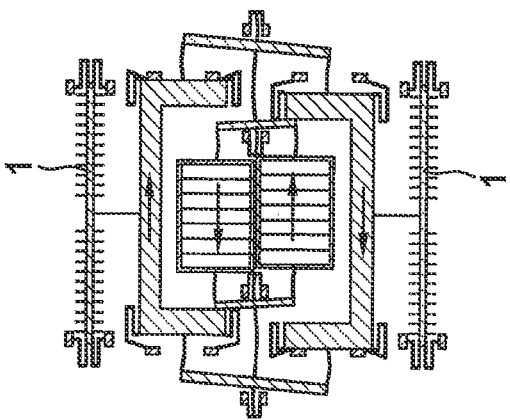
Figure 10:
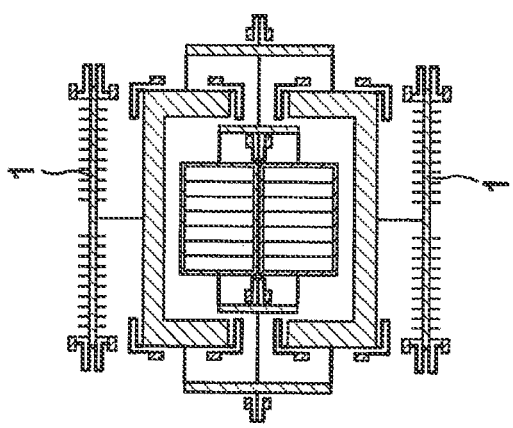
Figure 11:
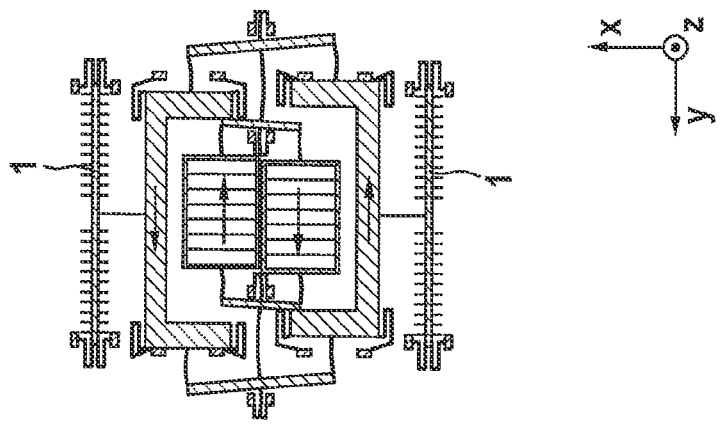
Figure 12:
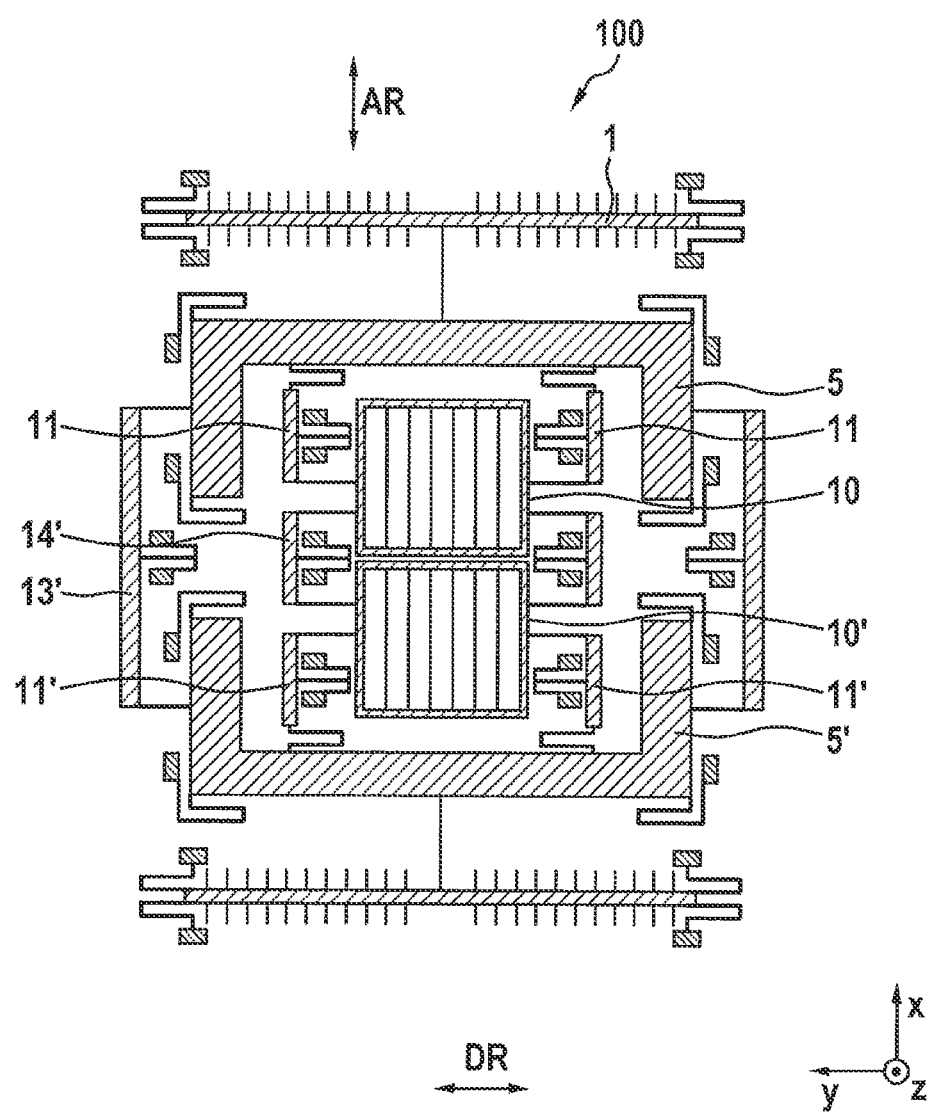
Figure 13:
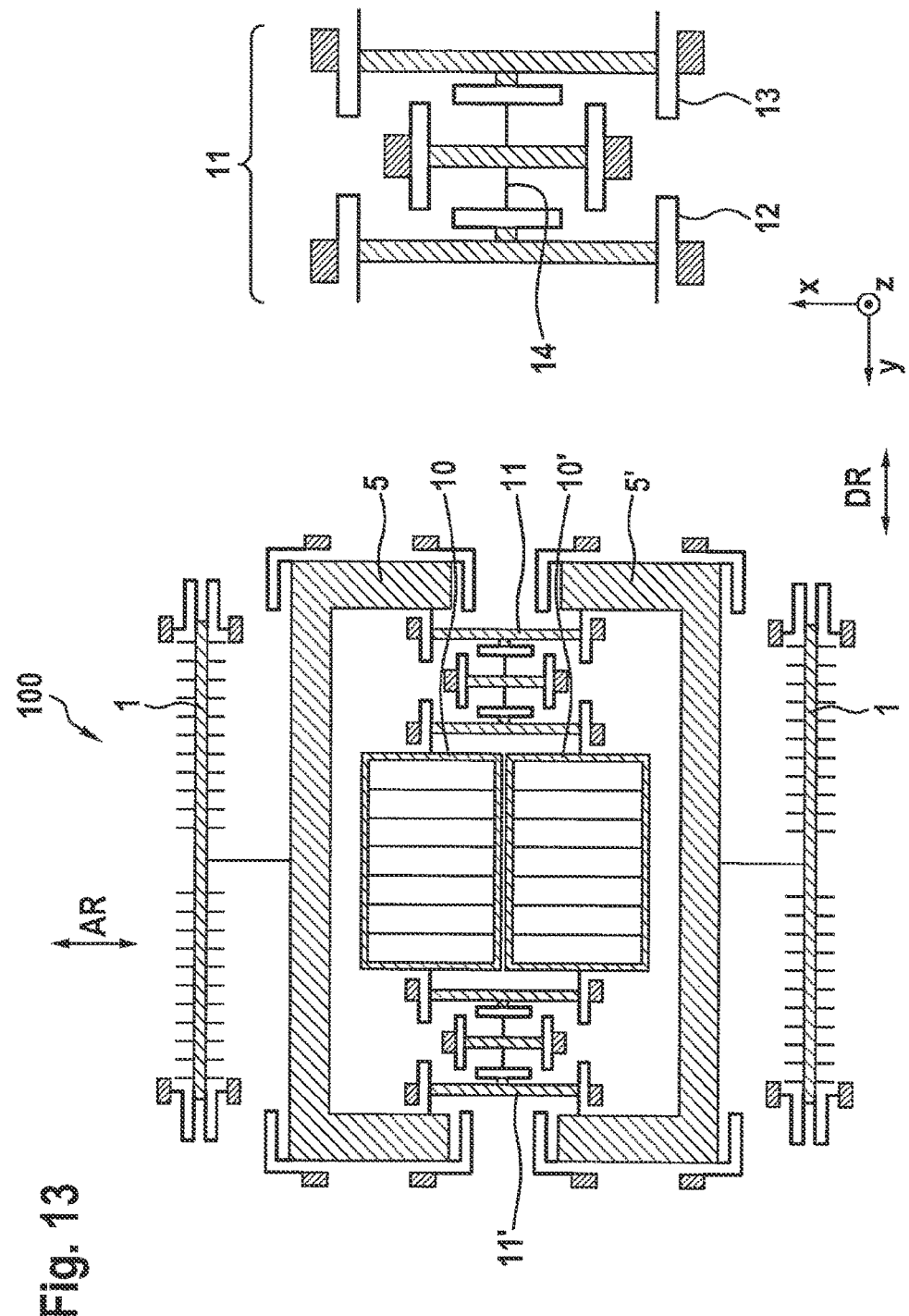
Figure 22:
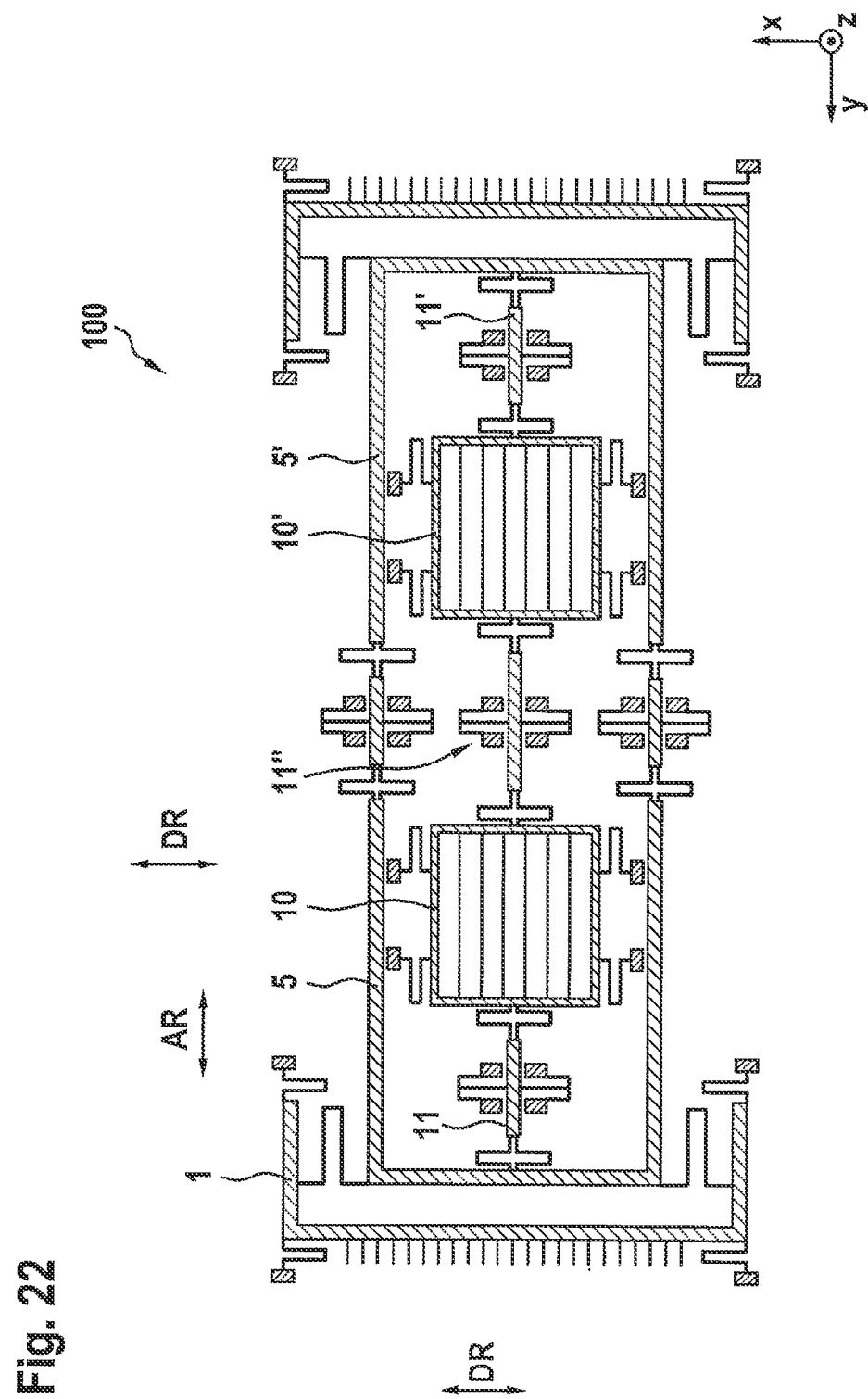
Figure 23:
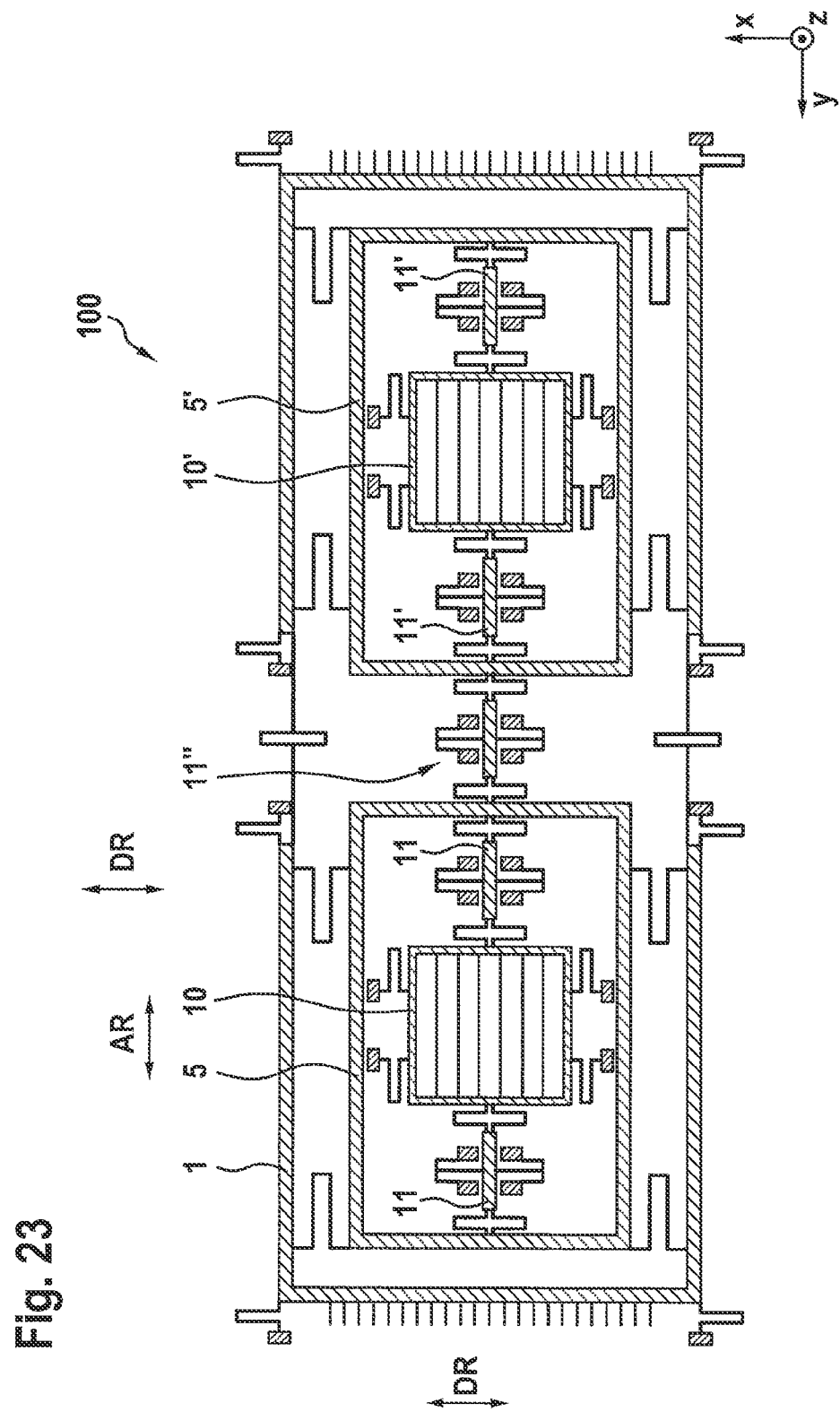

FIGS. 8 through 13 as well as 22 and 23 each show top views of different embodiment variants of a $\Omega_z$-sensor 100 according to the present invention. In each instance, first Coriolis mass 5 is coupled with first compensating mass 10 via first connection 11 and second Coriolis mass 5' is coupled with second compensating mass 10' via second connection 11'. In the embodiment variants according to FIGS. 8 through 13, first compensating mass 10 and second compensating mass 10' are linked by way of the special coupling via first and second connections 11, 11' to the substrate and are coupled with first and second Coriolis masses 5, 5', and therefore act simultaneously as detection element (that is, as second partial mass 9 of first Coriolis mass 5 or fourth partial mass 9' of second Coriolis mass 5'). First and second connections 11, 11' are formed in such a way that the antiparallel movement of first Coriolis mass 5 relative to first compensating mass 10 (or the antiparallel movement of second Coriolis mass 5' relative to second compensating mass 10') preferably takes place. The interfering parallel movement, which would take place because of a rotational acceleration about the z-direction (first direction OR), is suppressed. This is because in the embodiment variants according to FIGS. 8 through 13, a first rocker 12 and a second rocker 13 are connected to each other by a bending bar 14. Concerning this, in FIG. 8 and in FIG. 13, in each case an enlarged representation of two different embodiment variants of first connection 11 is shown by way of example in the right part of the figures. Bending bar 14 is softer with respect to a simple (U-shaped) plane (i.e., in the xy-plane or parallel to main extension direction 110 of substrate 101) bending than with respect to a double (S-shaped) plane bending. A movement of the two rockers 12, 13 in opposite direction is thereby possible in a flexurally softer or lower-frequency manner than an equidirectional, and therefore the movement of first and second Coriolis masses 5, 5' and first and second compensating masses 10, 10' in opposite direction is preferred. The latter is excited by the Coriolis force, the equidirectional movement of first and second Coriolis masses 5, 5' and first and second compensating masses 10, 10' is excited by a rotational acceleration about the z-direction or by a linear acceleration along the y-direction. This movement of the two rockers 12, 13 in opposite direction is illustrated again in FIGS. 9 through 11, FIG. 10 showing the rest state or state of equilibrium (likewise shown in enlarged form in FIG. 8), while FIGS. 9 and 11 show the two deflected states (in the sense of a movement or deflection of rockers 12, 13 or of Coriolis masses 5, 5' and compensating masses 10, 10', in each case in opposite direction). In this context, it is discernible that bending bar 14 is in each instance bent only in U-shaped fashion. The rocker-type coupling between compensating masses and Coriolis masses via first and second connections 11, 11' allows a movement of Coriolis masses 5, 5' in the x-direction (AR) without this being transferred to compensating masses 10, 10'. In response to the presence of a yaw rate $\Omega_z$, compensating masses 10, 10' (with the simultaneous function of a detection element, that is, of a second partial mass 9 of first Coriolis mass 5 or a fourth partial mass 9' of second Coriolis mass 5') are moved in opposite direction by Coriolis masses 5, 5' via the coupling by first and second connections 11, 11'. All further rockers are used to suppress interfering parallel oscillatory modes. In the embodiment variant of the yaw-rate sensor according to FIG. 12, first and second Coriolis masses 5, 5' are coupled to each other via a third connection 13' to substrate 101, and first and second compensating masses 10, 10' are coupled to each other via a fourth connection 14' to substrate 101. FIGS. 22 and 23 show further embodiment variants of a $\Omega_z$-sensor according to the present invention, in which it is provided by way of example that first Coriolis mass 5 and second Coriolis mass 5' in each case form a frame going around on three sides (that is, open on one side) (FIG. 22) or that first Coriolis mass 5 and second Coriolis mass 5' are each frame-shaped (in each instance in the form of a closed frame) and first compensating mass 10 is disposed within the frame of first Coriolis mass 5 (and furthermore, second compensating mass 10' is disposed within the frame of second Coriolis mass 5'). In this case, first and second connections 11, 11'(or a second connection 11") act like rockers or spiders whose ends oscillate in opposite direction in the plane.

Figure 14:
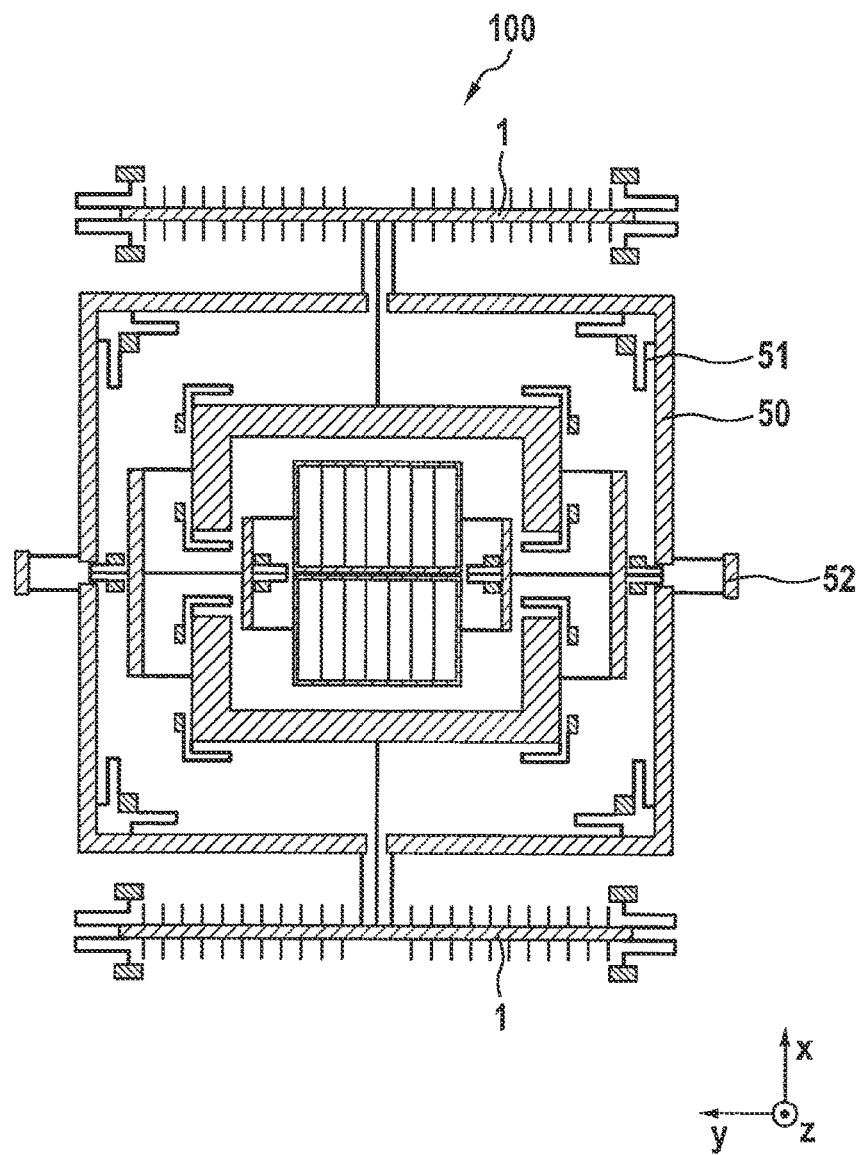
FIGS. 14 through 17 show an embodiment variant of a drive device.
Figure 17:
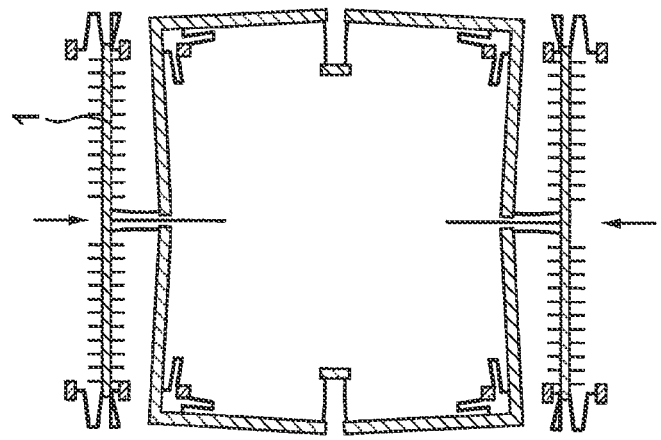
Figure 16:
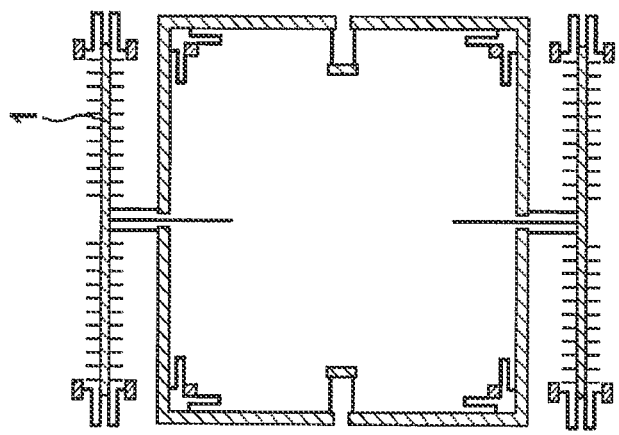
Figure 15:
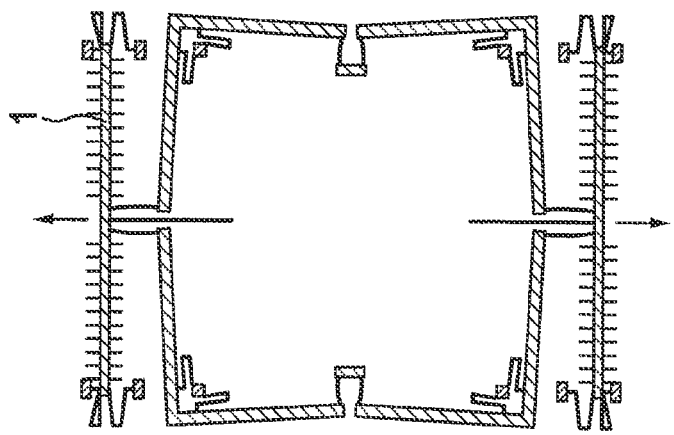

FIGS. 14 through 17 show an embodiment variant of a drive device 1, FIGS. 15 through 17 showing only drive device 1, and FIG. 14 additionally showing a yaw-rate sensor. Drive device 1 according to the embodiment variant shown has a drive frame, the drive frame having four angular elements 50 which in the corners of the frame, are connected to substrate 101 so as to be deflectable in rotatory manner, in each case two of angular elements 50 being joined to each other via U-shaped spring elements 52. The drive frame leads, via the four angular elements 50, to a shift in frequency of the interfering parallel drive mode to higher frequencies. In the desired antiparallel drive mode, Coriolis masses 5, 5' oscillate along the x-axis (drive direction AR) in phase opposition toward and away from each other. Optionally, the drive frame according to FIGS. 14 through 17 may be added to all variants of the present invention. The movement of Coriolis masses 5, 5' in opposite direction (i.e., antiparallel movement) is illustrated again in FIGS. 15 through 17, FIG. 16 showing the resting state or state of equilibrium (likewise shown in enlarged form in FIG. 14), while FIGS. 15 and 17 show the two deflected states (in the sense of a drive of Coriolis masses 5, 5', in each case in opposite direction).

Figure 18:
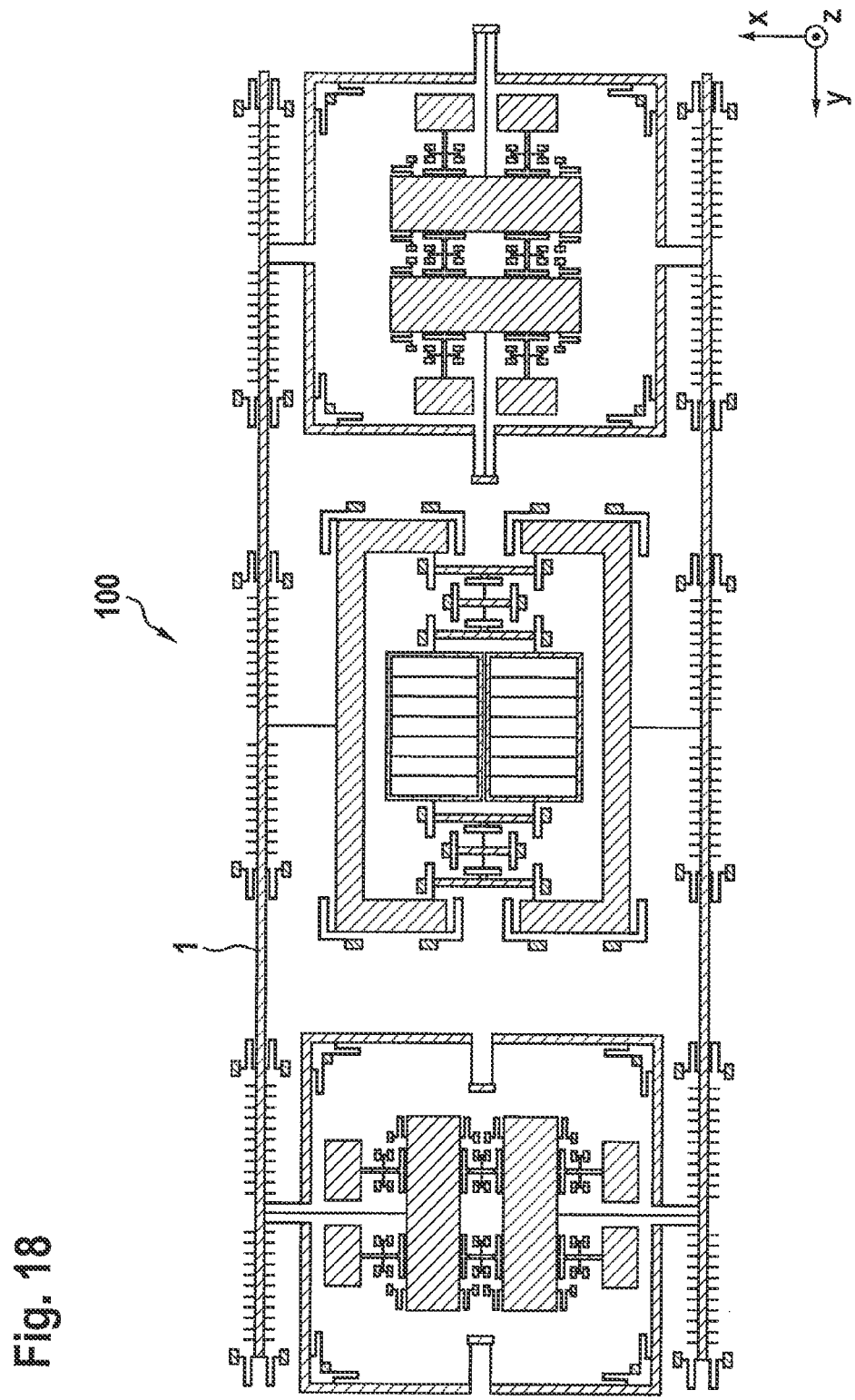
FIG. 18 shows an embodiment variant of a triaxial yaw-rate sensor.

FIG. 18 shows an embodiment variant of a triaxial or three-channel $\Omega_{xyz}$-yaw-rate sensor 100, including—by way of example—a $\Omega_y$-sensor and a $\Omega_x$-sensor (in each case outside) and a $\Omega_z$-sensor (in the middle), one drive structure or one drive device 1 in common being provided for all three yaw-rate sensors. By omitting one channel, $\Omega_{xy}$-yaw-rate sensors or $\Omega_{xz}$-yaw-rate sensors may be realized, as well.

Figure 19:
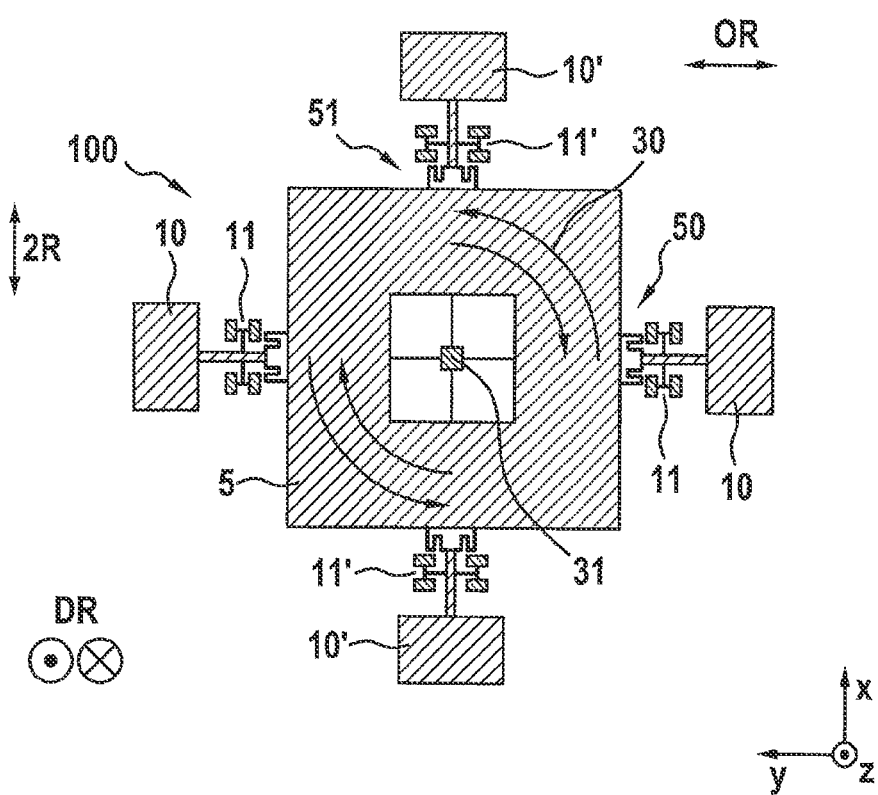
FIGS. 19 and 20 each shows different embodiment variants of a $\Omega_{xy}$-sensor.
Figure 20:
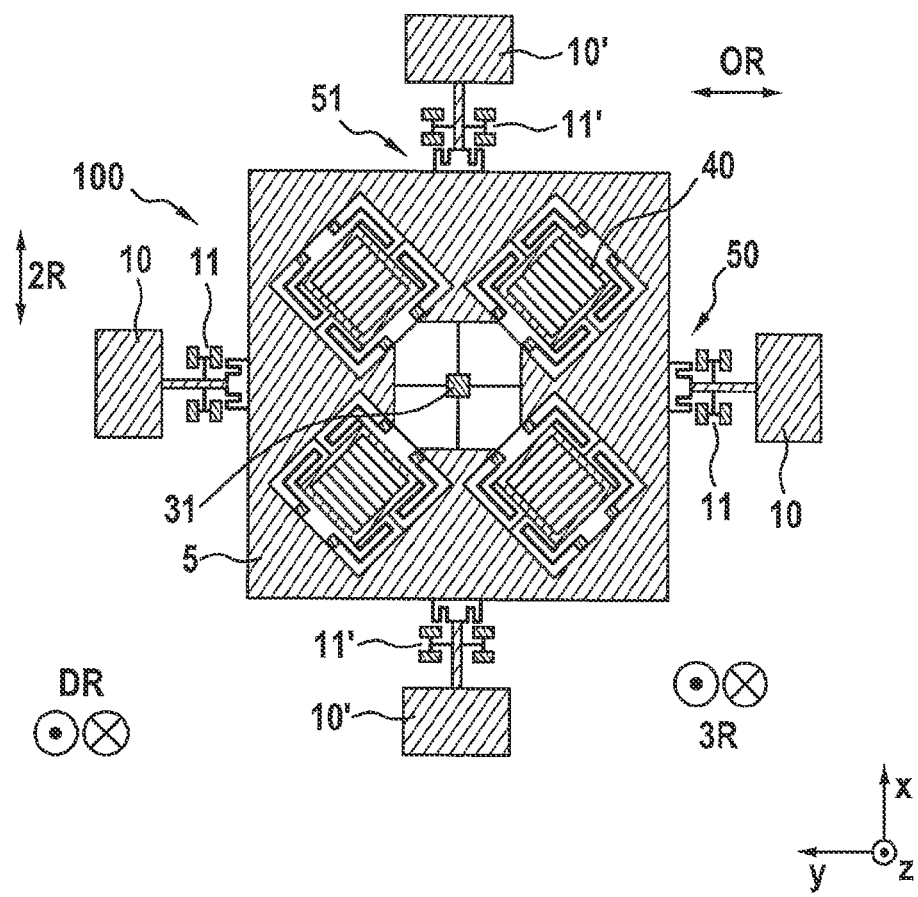

FIGS. 19 and 20 each shows an embodiment variant of a $\Omega_{xy}$-yaw-rate sensor 100, that is, according to the third specific embodiment of the present invention. FIG. 20 shows an embodiment variant in the form of a $\Omega_{xyz}$-yaw-rate sensor 100. In these two embodiment variants of the third specific embodiment, a centric rotor 5 is provided which is suspended from a central suspension mount 31 and is driven to a rotary oscillation 30 about the midpoint (by a drive not shown). The rotor has the function of a Coriolis oscillator, that is, a Coriolis mass 5 (or a "first" Coriolis mass 5). Below and/or above rotor 5 are electrodes (not drawn in) for detecting a deflection of rotor 5, the deflection being utilized as a measure for the Coriolis acceleration that acts along the z-direction, and specifically, both for yaw rates about a first direction OR and for yaw rates about a second direction 2R, both of which extend parallel to main extension plane 110 and perpendicular to each other. Accordingly, the yaw-rate sensor according to FIGS. 19 and 20 is used to detect a first yaw rate (about first direction OR extending parallel to main extension plane 110) and to detect a second yaw rate (about second direction 2R extending parallel to main extension plane 110). The yaw-rate sensor has a drive device (not shown) and (first) Coriolis mass 5, the drive device being configured to drive first Coriolis mass 5 to a rotary oscillation 30 about a direction extending perpendicular to main extension plane 110, and in the case of a yaw rate about first direction OR, a first partial area 50 of first Coriolis mass 5 undergoing a Coriolis acceleration parallel to detection direction DR, a second partial area 51 of first Coriolis mass 5 in the case of a yaw rate about second direction 2R likewise undergoing a Coriolis acceleration parallel to detection direction DR. In the present invention, the yaw-rate sensor according to both embodiment variants of the third specific embodiment has a first compensating mass 10 and a second compensating mass 10', first compensating mass 10 having a coupling with a first partial area 50 of first Coriolis mass 5 via a first connection 11 to substrate 101, and second compensating mass 10' having a coupling with a second partial area 51 of first Coriolis mass 5 via a second connection 11' to substrate 101, such that a deflection of first partial area 50 of first Coriolis mass 5 in a direction parallel to detection direction DR caused by a Coriolis acceleration leads to a deflection of first compensating mass 10 in opposite direction, and a deflection of second partial area 51 of first Coriolis mass 5 in a direction parallel to detection direction DR caused by a Coriolis acceleration leads to a deflection of second compensating mass 10' in opposite direction. Compared to the embodiment variant according to FIG. 19, in the embodiment variant according to FIG. 20, additional Coriolis masses 40 are provided, by which a yaw rate about the z-direction is detectable (i.e., for detecting a third yaw rate about third direction 3R extending parallel to the z-direction), and which take part tangentially in the drive movement and are deflected radially by a yaw rate, additional Coriolis masses 40 according to an embodiment variant not shown likewise being able to be coupled with compensating masses (via additional connections (likewise not shown)). Coriolis masses 40 have latticed electrodes, with which the Coriolis acceleration is detected via counter-electrodes (not shown) anchored to the substrate.

What is claimed is:

1. A yaw-rate sensor, comprising:
    a substrate having a main extension plane to detect a yaw rate about a first direction extending either parallel to the main extension plane or perpendicular to the main extension plane;
    a drive device;
    a first Coriolis mass, the drive device being configured to drive at least a part of the first Coriolis mass in a direction parallel to a drive direction extending perpendicular to the first direction, wherein in the case of the yaw rate about the first direction, at least the part of the first Coriolis mass undergoes a Coriolis acceleration parallel to a detection direction extending both perpendicular to the drive direction and perpendicular to the first direction; and
    a first compensating mass having a coupling with the first Coriolis mass via a first connection to the substrate, such that a deflection of the first Coriolis mass in a direction parallel to the detection direction caused by the Coriolis acceleration leads to a deflection of the first compensating mass in an opposite direction.

2. The yaw-rate sensor as recited in claim 1, wherein:
    the first Coriolis mass has a first partial mass and a second partial mass, the drive device being configured to drive the first partial mass of the first Coriolis mass in a direction parallel to the drive direction;
    in the case of the yaw rate about the first direction, the first partial mass of the first Coriolis mass undergoes the Coriolis acceleration parallel to the detection direction, the second partial mass of the first Coriolis mass thereby also deflecting; and
    the first compensating mass has a coupling with the second partial mass of the first Coriolis mass via the first connection to the substrate, such that a deflection of the second partial mass of the first Coriolis mass in the direction parallel to the detection direction caused by the Coriolis acceleration leads to the deflection of the first compensating mass in the opposite direction.

3. The yaw-rate sensor as recited in claim 1, wherein the first direction and the drive direction run parallel to the main extension plane, the drive device being configured to drive the first Coriolis mass in a direction parallel to the drive direction extending perpendicular to the first direction, the detection direction running perpendicular to the main extension plane.

4. The yaw-rate sensor as recited in claim 3, wherein, along the drive direction, the first Coriolis mass is disposed in a central area of the yaw-rate sensor and the first compensating mass is disposed in an edge area of the yaw-rate sensor, the first compensating mass being formed by two mass elements.

5. The yaw-rate sensor as recited in claim 3, wherein, along the drive direction, the first compensating mass is disposed in a central area of the yaw-rate sensor and the first Coriolis mass is disposed in an edge area of the yaw-rate sensor.

6. The yaw-rate sensor as recited in claim 3, wherein, along the first direction, the first Coriolis mass is disposed in a central area of the yaw-rate sensor and the first compensating mass is disposed in an edge area of the yaw-rate sensor, the first compensating mass being formed by two mass elements.

7. The yaw-rate sensor as recited in claim 1, wherein the first Coriolis mass is in the form of a closed frame, and the first compensating mass is disposed within the frame of the first Coriolis mass.

8. The yaw-rate sensor as recited in claim 1, wherein the yaw-rate sensor has a second Coriolis mass, the drive device being configured to drive at least one part of the second Coriolis mass in a direction parallel to the drive direction, wherein in the case of the yaw rate about the first direction, at least the part of the second Coriolis mass undergoing the Coriolis acceleration parallel to the detection direction, the yaw-rate sensor having a second compensating mass, the second compensating mass having a coupling with the second Coriolis mass via a second connection to the substrate, such that a deflection of the second Coriolis mass in a direction parallel to the detection direction caused by the Coriolis acceleration leads to a deflection of the second compensating mass in an opposite direction.

9. The yaw-rate sensor as recited in claim 8, wherein:
    the first Coriolis mass has a first partial mass and a second partial mass, the drive device being configured to drive the first partial mass of the first Coriolis mass in a direction parallel to the drive direction;
    in the case of the yaw rate about the first direction, the first partial mass of the first Coriolis mass undergoes the Coriolis acceleration parallel to the detection direction, the second partial mass of the first Coriolis mass thereby also deflecting;
    the first compensating mass has a coupling with the second partial mass of the first Coriolis mass via the first connection to the substrate, such that a deflection of the second partial mass of the first Coriolis mass in the direction parallel to the detection direction caused by the Coriolis acceleration leads to the deflection of the first compensating mass in the opposite direction;
    the second Coriolis mass has a third partial mass and a fourth partial mass, the drive device being configured to drive the third partial mass of the second Coriolis mass in a direction parallel to the drive direction;
    in the case of the yaw rate about the first direction, the third partial mass of the second Coriolis mass undergoes the Coriolis acceleration parallel to the detection direction, the fourth partial mass of the second Coriolis mass thereby also deflecting;
    the second compensating mass has a coupling with the fourth partial mass of the second Coriolis mass via the second connection to the substrate, such that a deflection of the fourth partial mass of the second Coriolis mass in the direction parallel to the detection direction caused by the Coriolis acceleration leads to the deflection of the second compensating mass in the opposite direction.

10. The yaw-rate sensor as recited in claim 8, wherein the first direction runs perpendicular to the main extension plane, the drive device being configured to drive the first Coriolis mass and the second Coriolis mass in a direction parallel to the drive direction extending perpendicular to the first direction, wherein in the case of the yaw rate about the first direction, the first Coriolis mass and the second Coriolis mass undergo the Coriolis acceleration parallel to the detection direction, the first compensating mass also being coupled with the second Coriolis mass and the second compensating mass being coupled with the first Coriolis mass via the first connection and via the second connection, respectively.

11. The yaw-rate sensor as recited in claim 8, wherein the drive device is configured to drive the first Coriolis mass and the second Coriolis mass in the drive direction, each in an opposite direction relative to each other.

12. The yaw-rate sensor as recited in claim 1, wherein the first direction runs perpendicular to the main extension plane, the drive device being configured to drive the first Coriolis mass and the second Coriolis mass in a direction parallel to the drive direction extending perpendicular to the first direction, wherein in the case of the yaw rate about the first direction, the first Coriolis mass and the second Coriolis mass undergo the Coriolis acceleration parallel to the detection direction, and at least one of: i) the first and second Coriolis masses being coupled via a third connection to the substrate, and ii) the first and second compensating masses being coupled via a fourth connection to the substrate.

13. The yaw-rate sensor as recited in claim 1, wherein the drive device has a drive frame, the drive frame having four angular elements which, in corners of the frame, are connected to the substrate in a manner allowing them to deflect in a rotatory manner, in each case, two of the angular elements being joined to each other via U-shaped spring elements.

14. The yaw-rate sensor as recited in claim 1, wherein: the first Coriolis mass includes a first partial mass and a second partial mass, the drive device being configured to drive the first partial mass of the first Coriolis mass in a direction parallel to the drive direction;
   the first compensating mass has a coupling with the second partial mass of the first Coriolis mass via the first connection to the substrate, such that a deflection of the second partial mass of the first Coriolis mass in a direction parallel to the detection direction caused by the Coriolis acceleration leads to a deflection of the first compensating mass in an opposite direction;
the yaw-rate sensor includes a second Coriolis mass, which includes a third partial mass and a fourth partial mass, the drive device being configured to drive the third partial mass of the second Coriolis mass in a direction parallel to the drive direction;
the yaw-rate sensor includes a second compensating mass, the second compensating mass having a coupling with the second Coriolis mass via a second connection to the substrate, such that a deflection of the second Coriolis mass in a direction parallel to the detection direction caused by the Coriolis acceleration leads to a deflection of the second compensating mass in an opposite direction;
the second compensating mass has a coupling with the fourth partial mass of the second Coriolis mass via the second connection to the substrate, such that a deflection of the fourth partial mass of the second Coriolis mass in the direction parallel to the detection direction caused by the Coriolis acceleration leads to the deflection of the second compensating mass in the opposite direction;
in the case of the yaw rate about the first direction:
   the first partial mass of the first Coriolis mass undergoes a Coriolis acceleration parallel to the detection direction, the second partial mass of the first Coriolis mass thereby also deflecting; and
   the third partial mass of the second Coriolis mass undergoes a Coriolis acceleration parallel to the detection direction, the fourth partial mass of the second Coriolis mass thereby also deflecting; and
the drive device is configured to drive the first partial mass of the first Coriolis mass and the third partial mass of the second Coriolis mass in a drive direction, each in an opposite direction relative to each other.

\* \* \* \* \*